(12) United States Patent
Chiang et al.

(10) Patent No.: US 8,068,344 B2
(45) Date of Patent: Nov. 29, 2011

(54) ELECTRONIC APPARATUS

(75) Inventors: Chao-Lun Chiang, Taipei (TW);
Chien-Chung Liao, Taipei (TW);
Chih-Lin Ho, Taipei (TW)

(73) Assignee: Inventec Corporation, Taipei (TW)

( * ) Notice: Subject to any disclaimer, the term of this patent is extended or adjusted under 35 U.S.C. 154(b) by 247 days.

(21) Appl. No.: 12/612,338

(22) Filed: Nov. 4, 2009

(65) Prior Publication Data

US 2010/0110646 A1  May 6, 2010

(30) Foreign Application Priority Data

Nov. 6, 2008  (TW) ................ 97142955 A

(51) Int. Cl.
*H05K 5/02* (2006.01)
(52) U.S. Cl. .................. 361/737; 439/946; 439/945
(58) Field of Classification Search .......... 361/737; 439/945, 946; 235/492
See application file for complete search history.

(56) References Cited

U.S. PATENT DOCUMENTS

| | | | | |
|---|---|---|---|---|
| 5,889,649 A | * | 3/1999 | Nabetani et al. | 361/679.38 |
| 6,231,360 B1 | * | 5/2001 | Horie | 439/159 |
| 6,519,158 B2 | * | 2/2003 | Kashima | 361/737 |
| 6,760,228 B1 | * | 7/2004 | Chi et al. | 361/737 |
| 7,184,274 B2 | * | 2/2007 | Wu et al. | 361/752 |

* cited by examiner

*Primary Examiner* — Dameon Levi
(74) *Attorney, Agent, or Firm* — Muncy, Geissler, Olds & Lowe, PLLC

(57) ABSTRACT

An electronic apparatus, which accommodates a chip card, includes a casing, a limit element and a carrier. The limit element is connected to the casing and has a protruding part. The carrier is slidingly disposed on the casing and has at least a contact area disposed on a side of the carrier. The limit element is located at a first position as the protruding part contacts the contact area, and the limit element is located at a second position as the protruding part is away from the contact area. The protruding part moves between the first position and the second position.

13 Claims, 4 Drawing Sheets

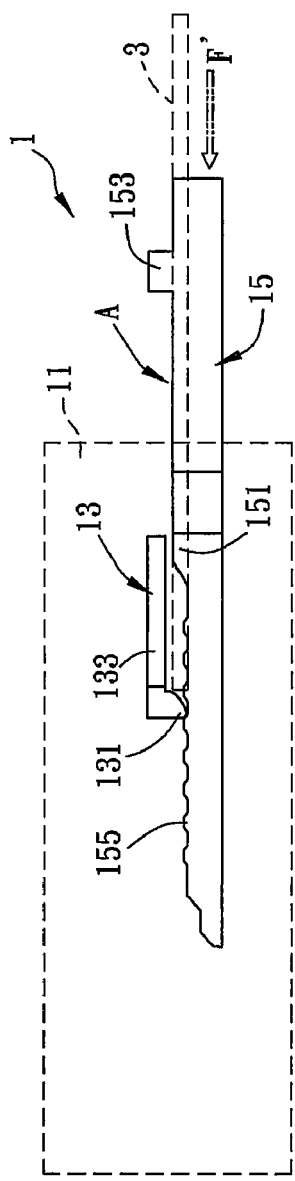
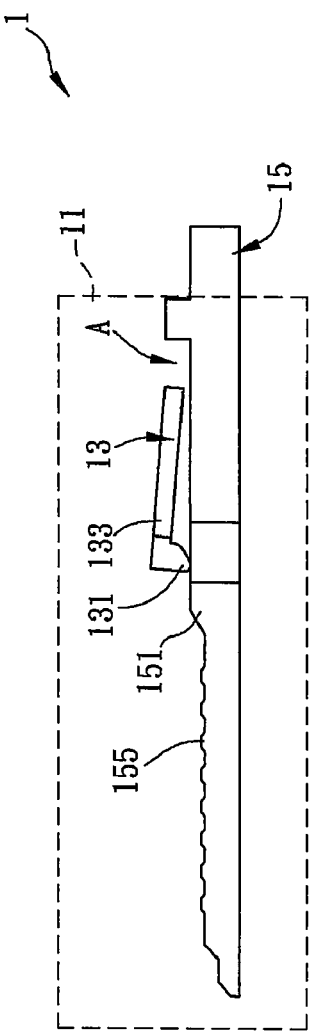

ELECTRONIC APPARATUS

CROSS REFERENCE TO RELATED APPLICATIONS

This Non-provisional application claims priority under 35 U.S.C. §119(a) on Patent Application No(s). 097142955 filed in Taiwan, Republic of China on Nov. 6, 2008, the entire contents of which are hereby incorporated by reference.

BACKGROUND OF THE INVENTION

1. Field of Invention

The present invention relates to an electronic apparatus and, in particular, to an electronic apparatus that a chip card can be easily taken out from or disposed therein.

2. Related Art

Accompanying progressive of the technology, the electronic apparatus (e.g. the cell phone) has been widely used in daily life. In order to have a more preferable extension interface in the electronic apparatus, the electronic apparatus normally includes an extension slot (e.g. a memory card slot or an ID card slot) for multifunctional extension in the future.

For preventing improper sliding or shifting of the extension card, standards are needed for the extension card and the corresponding slot. However, when it is desired to replace the electronic apparatus or to change the extension card in the electronic apparatus, since the extension card and the slot are connected tightly, it could be difficult to remove the extension card, or an additional tool is needed to remove the extension card. Regarding to this, the forces applied improperly can cause the deformation of or scratch on the extension card, or even cause contact problems of the extension card.

Therefore, since the conventional electronic apparatus is not idealistic in practice, it is an important subject to provide an electronic apparatus that the chip card can be easily removed.

SUMMARY OF THE INVENTION

In view of the foregoing, the present invention is to provide an electronic apparatus having an operation property for easily removing a chip card.

To achieve the above, an electronic apparatus according to the present invention, which is used to accommodate a chip card, includes a casing, a limit element, and a carrier. The limit element is connected to the casing and includes a protruding part. The carrier is slidingly disposed on the casing and includes at least one contact area disposed on a side of the carrier. The limit element is located at a first position as the protruding part leans against the contact area and is located at a second position as the protruding part is away from the contact area. The protruding part moves between the first position and the second position.

As mentioned above, in an electronic apparatus according to the present invention, as the chip card is removed, the carrier can be moved as well as the contact area and the chip card, such that the protruding part of the limit element is in the second position for restricting the disposition of the chip card, hence the chip card can be removed by moving only the carrier. Therefore, removing process of the chip card according to the present invention can be easily operated. Compared to the prior art, the electronic apparatus of the present invention makes the removing process of the chip card easier by the relative movement between the limit element and the carrier disposed in the casing, and by the slight vibration of one end of the limit element.

BRIEF DESCRIPTION OF THE DRAWINGS

The invention will become more fully understood from the detailed description and accompanying drawings, which are given for illustration only, and thus are not limitative of the present invention, and wherein:

FIG. 2C is a schematic view of FIG. 2B pushing back a carrier;

FIG. 2D is a schematic view of FIG. 2A without accommodating the chip card; and

DETAILED DESCRIPTION OF THE INVENTION

The present invention will be apparent from the following detailed description, which proceeds with reference to the accompanying drawings, wherein the same references relate to the same elements.

Figure 1:
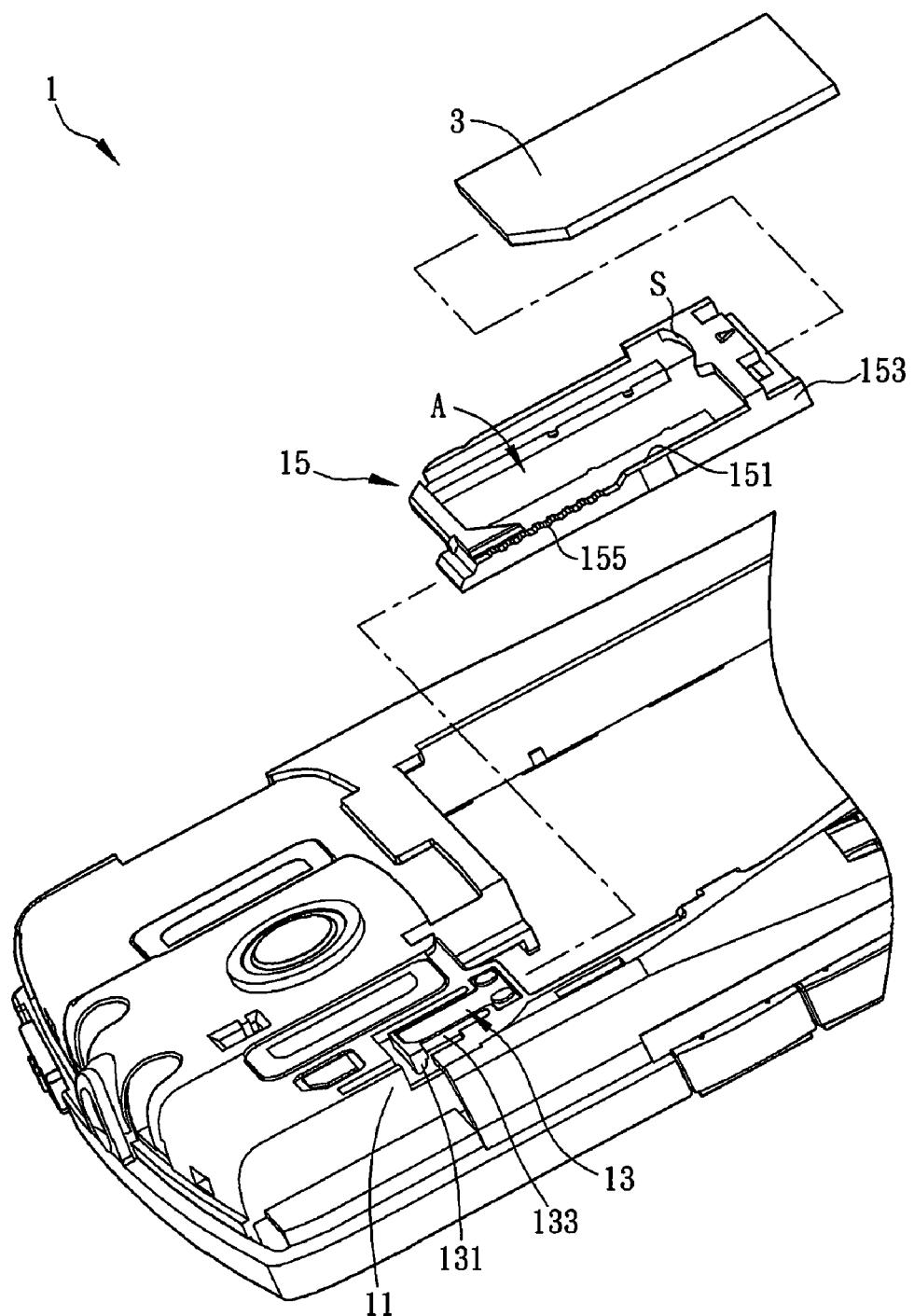
FIG. 1 is a schematic view of an assembled electronic apparatus according to the present invention.

FIG. 1 is an exploded view of an electronic apparatus 1 according to the present invention. With reference to FIG. 1, the electronic apparatus 1 accommodates a chip card 3. Regarding to this, the electronic apparatus 1 is a mobile communication device (e.g. a cell phone) and the chip card 3 is a subscriber identity module (SIM) card for example but not limited to these.

The electronic apparatus 1 includes a casing 11, a limit element 13, and a carrier 15. The limit element 13 is connected to the casing 11 and includes a protruding part 131. In the embodiment, the limit element 13 further includes a connecting part 133; one end of the connecting part 133 is connected to the casing 11 and the other end of the connecting part 133 is connected to the protruding part 131. The limit element 13 can be an elastic sheet or an elastic arm. Moreover, the protruding part 131 of the limit element 13 and the connecting part 133 can further be integrally formed.

The carrier 15 is slidingly disposed on the casing 11 and includes at least one contact area 151, which is disposed on a side of the carrier 15. In the embodiment, the carrier 15 includes the above-mentioned contact area 151 and a concavo-convex structure 155 on its one side. The concavo-convex structure 155 is disposed adjacent to the contact area 151 and a height difference is between the concavo-convex structure 155 and the contact area 151. For that, the contact area 151 and the concavo-convex structure 155 on the carrier 15 are integrally formed for example but not limited to this.

As a user moves the carrier 15, a relative sliding movement occurs between the carrier 15 and the limit element 13. As the limit element 13 slides on the concavo-convex structure 155 of the carrier 15, a slight vibration effect (e.g. an upward-and-downward vibration) of the limit element 13 can be generated, such that the user can tell the current relative position between the limit element 13 and the carrier 15 by touching. Once the limit element 13 slides into the contact area 151 of the carrier 15, since the contact surface between the contact area 151 and the limit element 13 is a smooth surface, the user can tell that the limit element 13 has already slid into the contact area 151 of the carrier 15. In other words, the sliding movement between the limit element 13 and the carrier 15 has come to an end.

In addition, the carrier 15 further includes a blocking bar 153, which is disposed perpendicularly adjacent to the contact area 151. An accommodating space A formed by the blocking bar 153 and the carrier 15 is used to accommodate the chip card 3.

Additionally, the electronic apparatus 1 may further include an electrically-connecting unit (e.g. a gold finger, not shown). Regarding to this, the electrically-connecting unit can be disposed under the accommodating space A for example, thus the carrier 15 can be a hollow structure with an opening. Meanwhile, an opening can be disposed correspondingly under the accommodating space A; hence the chip area of the chip card 3 (not shown) can be electrically connected to the electrically-connecting unit. Furthermore, the design standards such as the shape and the size of the accommodating space A can be varied according to the standards of different chip cards 3.

Moreover, the blocking bar 153 further includes an arc surface S. After the user disposes the carrier 15 and the chip card 3 in the casing 11, the arc surface S is able to provide a contact surface corresponding with the radian of a finger. That is, when the chip card 3 is to be removed, the user can hook the arc surface S and pull away the carrier 15 from the casing 11. Hence the electronic apparatus 1 of the present invention is capable of moving the carrier 15 with the arc surface S design, such that the operation of the entire structure can be easier.

The above-mentioned carrier 15 can be formed by injecting, pressing, casting, or mechanical processing. The material of the carrier 15 can be plastic, rubber, polypropylene (PP), polycarbonate (PC), epoxy, polystyrene (PS), polymethyl methacrylate (PMMA), acrylic resin, silicone, acrylonitrile butadiene styrene (ABS), or other insulating material.

Of course, the above-mentioned electronic apparatus 1 can be, for example, a personal digital assistant (PDA), a digital camera, an MP3 player, or an MP4 player according to actual demands. The chip card 3 can also be a memory card, for example but not limited to, a secure digital memory card (SD), a mini secure digital memory card (mini SD), a secure digital high capacity memory card (SDHC), a compact flash memory card (CF), a type-I compact flash memory card, a type-II compact flash memory card, a multimedia memory card (MMC), a multimedia memory card version 4.0 (MMC 4.0), a reduced size multimedia memory card (RS-MMC), a smart media memory card (SM), an extreme digital picture memory card (XD), a memory stick memory card (MS), a magic gate memory stick memory card (MGMS), a duo memory stick memory card (MS Duo), a pro memory stick memory card (MS Pro), or a trans flash memory card (T-Flash).

Figure 2A:
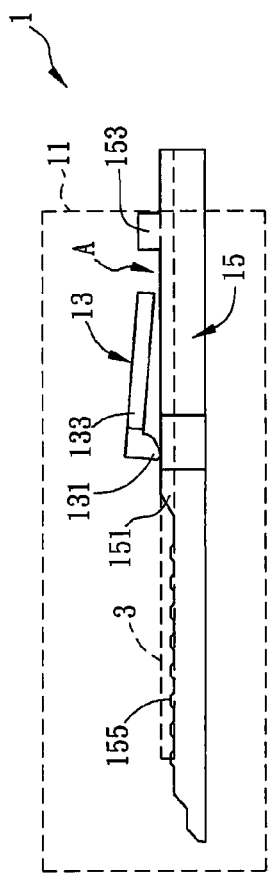
FIG. 2A is a schematic view of an electronic apparatus accommodating a chip card according to a preferred embodiment of the present invention.
Figure 2B:
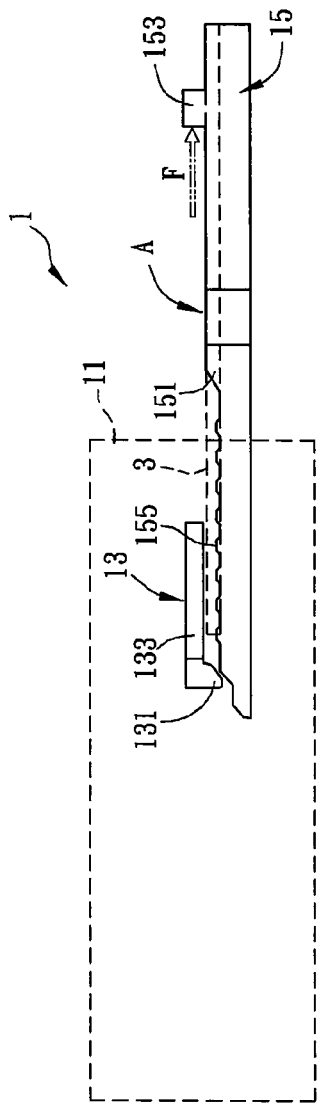
FIG. 2B is a schematic view of the electronic apparatus in FIG. 2A removing the chip card.

FIGS. 2A, 2B, 2C, and 2D illustrate how to remove the chip card from an electronic apparatus according to a preferred embodiment of the present invention. FIG. 2A is a schematic view of the electronic apparatus accommodating the chip card, FIG. 2B is a schematic view of FIG. 2A removing the carrier and the chip card, FIG. 2C is a schematic view of FIG. 2B pushing back a carrier, and FIG. 2D is a schematic view of FIG. 2A without accommodating the chip card.

Firstly, with reference to FIGS. 2A and 2B, as the protruding part 131 leans against the contact area 151, the limit element 13 has a first position, as shown in FIG. 2A. Since the carrier 15 slides into the casing 11 of the electronic apparatus 1, as the chip card 3 is to be replaced, an external force F is provided from the outside of the casing 11, as shown in FIG. 2B. Thus, the chip card 3 can be removed from the casing 11 along the direction of external force F by moving the carrier 15 as well as the contact area 151 and the chip card 3. While the carrier 15 is removed along the direction of external force F, the contact area 151 starts moving away from the protruding part 131 of the limit element 13. Meanwhile, the limit element 13 has a second position as shown in FIG. 2B. Since an end of the connecting part 133 of the limit element 13 is connected to the casing 11 (not shown), the protruding part 131 can move between the first position and the second position.

Figure 3:
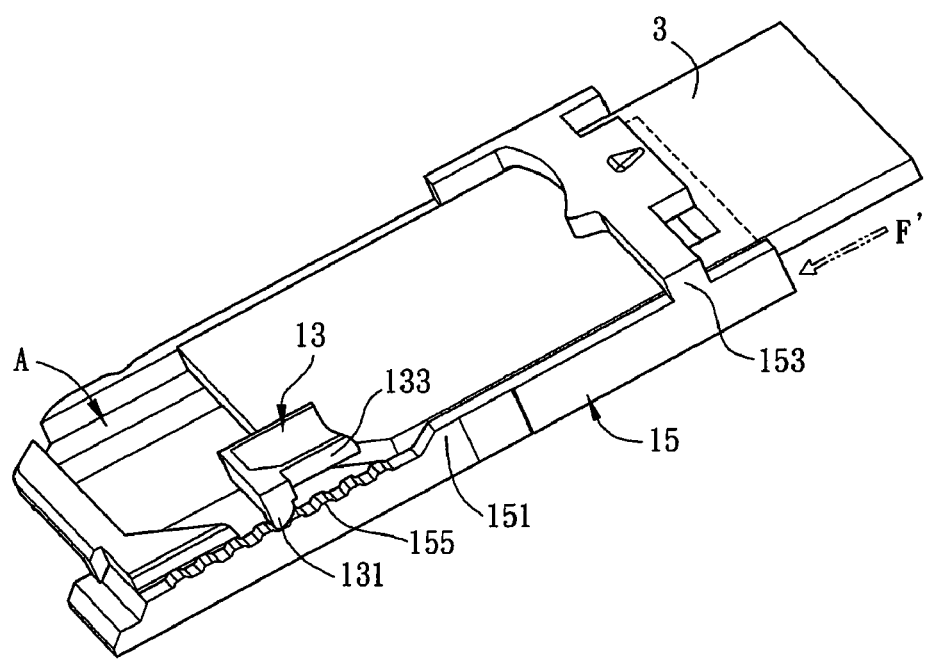
FIG. 3 is a three-dimensional schematic view of FIG. 2C.

FIG. 3 is a three-dimensional schematic view of FIG. 2C. With reference to FIGS. 2C and 3, it illustrates how the limit element stops the chip card from returning to the casing.

When the limit element 13 is in the second position, the chip card 3 is still disposed in the accommodating space A formed between the blocking bar 153 and the carrier 15, hence the chip card 3 cannot be easily removed from the accommodating space A. Therefore, an external force F' has to be applied to the lower part of the carrier 15 for pushing the carrier 15 back. More specifically, when the carrier 15 is pushed back by the external force F' to make the concavo-convex structure 155 contact the protruding part 131 of the limit element 13, because the limit element 13 is still in a second position (providing a limit effect to the chip card 3), only the carrier 15 is pushed into the casing 11. Meanwhile, a relative movement between the chip card 3 and the carrier 15 is generated; hence the chip card 3 will gradually be exposed to the outside the accommodating space A. In other words, as the carrier 15 slowly return to the casing 11, the chip card 3 can be exposed to the outside of the accommodating space A correspondingly, such that the chip card 3 can be easily removed from the casing 11.

After the chip card 3 is removed from the accommodating space A, a part of the carrier 15 is still exposed to the outside of the casing 11. At this point of the time, the carrier 15 is again pushed back and the contact area 151 leans against the protruding part 131 of the limit element 13. Hence the protruding part 131 is lifted up to the second position, as shown in FIG. 2D.

At this time, since the protruding part 131 is lifted up to the second position, if the chip card 3 is again to be inserted into the accommodating space A, the limit element 13 will not have the limit effect on the chip card 3. Thus, the chip card 3 can be easily pushed into position. After the chip card 3 is inserted into position, it can be electrically connected to the electrically-connecting unit (not shown). The entire electronic apparatus 1 can thus be restored to the state as shown in FIG. 2A.

According to the above, the protruding part 131 can be moved between the first position and the second position by moving the contact area 151. The limit element 13 is formed with an elastic material or a flexible material, for example but not limited to, a metal elastic chip or rubber. The electronic apparatus 1 of the present invention allows the limit element 13 to move between the first position and the second position by moving the contact area 151 of the carrier 15.

However, in order to make the contact area 151 of the carrier 15 and the protruding part 131 of the limit element 13 smoothly contact and lean against each other, the contact area 151 is wedge-shaped for example. The contact surface between the protruding part 131 and the contact area 151 also includes a corresponding structure, for example, a wedge-shaped structure. When the contact area 151 leans against the protruding part 131, the direction of the resultant force can be changed, and the protruding part 131 is lifted up to the second position. The wedge-shaped structure in the embodiment is used for example but not limited to this. The above-mentioned contact surface can be, for example, arc-shaped according to actual demands.

To sum up, in an electronic apparatus according to the present invention, as the chip card is removed, the carrier can be moved as well as the contact area and the chip card, such that the protruding part of the limit element is in the second position for restricting the disposition of the chip card, hence the chip card can be removed. Therefore, removing process of the chip card according to the present invention can be easily operated. Compared to the prior art, the electronic apparatus of the present invention makes the removing process of the chip card easier by relative movement between the limit element and the carrier disposed in the casing, and by the property of slight vibration of one end of the limit element.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic apparatus accommodating a chip card, comprising:
    a casing;
    a limit element connected to the casing and comprising a protruding part; and
    a carrier slidingly disposed on the casing and comprising a contact area disposed on a side of the carrier, wherein the limit element is located at a first position as the protruding part leans against the contact area and is located at a second position as the protruding part is away from the contact area, and the protruding part moves between the first position and the second position.

2. The electronic apparatus according to claim 1, wherein the limit element further comprises a connecting part, one end of the connecting part is connected to the casing, and the other end of the connecting part is connected to the protruding part.

3. The electronic apparatus according to claim 1, wherein the contact area and the protruding part are wedge-shaped or arc-shaped.

4. The electronic apparatus according to claim 1, wherein the carrier further comprises a blocking bar perpendicularly disposed adjacent to the contact area.

5. The electronic apparatus according to claim 4, wherein an accommodating space is formed between the blocking bar and the carrier to accommodate the chip card.

6. The electronic apparatus according to claim 4, wherein the blocking bar further comprises an arc surface.

7. The electronic apparatus according to claim 1, wherein the limit element is made of an elastic material or a flexible material.

8. The electronic apparatus according to claim 1, wherein the carrier further comprises a concavo-convex structure disposed adjacent to the contact area, and a height difference is between the concavo-convex structure and the contact area.

9. The electronic apparatus according to claim 1, further comprising:
    an electrically-connecting unit disposed in the casing and coupled to the chip card.

10. The electronic apparatus according to claim 1, wherein the carrier comprises an opening and the chip card is coupled to the electrically-connecting unit via the opening.

11. The electronic apparatus according to claim 1, wherein the chip card is a memory card or a subscriber identity module (SIM) card.

12. The electronic apparatus according to claim 11, wherein the memory card is a secure digital memory card (SD), a mini secure digital memory card (mini SD), a secure digital high capacity memory card (SDHC), a compact flash memory card (CF), a type-I compact flash memory card, a type-II compact flash memory card, a multimedia memory card (MMC), a multimedia memory card version 4.0 (MMC 4.0), a reduced size multimedia memory card (RS-MMC), a smart media memory card (SM), an extreme digital picture memory card (XD), a memory stick memory card (MS), a magic gate memory stick memory card (MGMS), a duo memory stick memory card (MS Duo), a pro memory stick memory card (MS Pro), or a trans flash memory card (T-Flash).

13. The electronic apparatus according to claim 1 comprising a personal digital assistant (PDA), a digital camera, an MP3 player, an MP4 player, or a mobile communication device.

* * * * *